United States Patent
Masaki et al.

(10) Patent No.: US 8,603,618 B2
(45) Date of Patent: Dec. 10, 2013

(54) POLYAMIDE IMIDE RESIN COMPOSITION AND INSULATING SHEET INCLUDING THE POLYAMIDE IMIDE RESIN COMPOSITION

(75) Inventors: Shunsuke Masaki, Ibaraki (JP); Kiichiro Matsushita, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 37 days.

(21) Appl. No.: 13/291,556

(22) Filed: Nov. 8, 2011

(65) Prior Publication Data

US 2012/0123063 A1     May 17, 2012

(30) Foreign Application Priority Data

Nov. 12, 2010 (JP) ................................ 2010-253598

(51) Int. Cl.
    *C08L 77/00*     (2006.01)
    *C08L 79/08*     (2006.01)
    *B32B 27/34*     (2006.01)

(52) U.S. Cl.
    USPC ............ 428/220; 525/420; 525/432; 525/436

(58) Field of Classification Search
    USPC ........................... 525/420, 432, 436; 428/220
    See application file for complete search history.

(56) References Cited

U.S. PATENT DOCUMENTS 7,713,892 B2     5/2010     Kihara et al.
2009/0047858 A1     2/2009     Kihara et al.

FOREIGN PATENT DOCUMENTS

JP     08-143772     *     6/1996
JP     2006-321183 A     11/2006

OTHER PUBLICATIONS

Machine translation of JP 08-143772.*

* cited by examiner

*Primary Examiner* — Ana Woodward
(74) *Attorney, Agent, or Firm* — Sughrue Mion, PLLC

(57) ABSTRACT

An object of the present invention is to provide a polyamide imide resin composition having excellent in heat resistance, mechanical strength, and tracking resistance. The polyamide imide resin composition includes a polymer blend of a polyamide imide resin including an alicyclic structure and an aromatic polyamide imide resin.

5 Claims, No Drawings

POLYAMIDE IMIDE RESIN COMPOSITION AND INSULATING SHEET INCLUDING THE POLYAMIDE IMIDE RESIN COMPOSITION

This application claims priority under 35 U.S.C. Section 119 to Japanese Patent Application No. 2010-253598 filed on Nov. 12, 2010, which is herein incorporated by reference.

BACKGROUND OF THE INVENTION

1. Field of the Invention

The present invention relates to a polyamide imide resin composition having excellent heat resistance, mechanical strength, and tracking resistance.

2. Description of the Related Art

In recent years, a material having high heat resistance has been required as an insulating material. Examples of the material having high heat resistance include aromatic polymers such as a polyimide resin and a polyamide imide resin. However, the aromatic polymer has a problem of inferior tracking resistance, which is one of electrical properties required for the insulating material (Kanbe, Hirotaro. (1970): Heat resistance of Polymers, BAIFUKAN CO., LTD.).

Tracking is caused by production and accumulation of free carbon from a solid insulator. For example, a method involving filling a system with an inorganic substance such as a metal hydrate of magnesium hydroxide, aluminum hydroxide, or the like to decrease the free carbon has been proposed as a method for improvement of tracking resistance of a resin. However, the method may impair original properties of the resin such as breaking strength and breaking elongation depending on the filled amount of the inorganic substance. Meanwhile, as a method of releasing carbon to outside the system not as the free carbons but as a volatile carbon compound in thermal decomposition of the resin, for example, a method involving introducing an aliphatic structure to suppress production of the free carbons may be employed. However, in this case, the heat resistance (e.g., a glass transition temperature used as an index of a continuous use temperature) may be lowered. As described above, it is difficult to achieve both the tracking resistance and original properties of the resin.

Meanwhile, in a rotating electrical machine such as a motor or a generator or a transformer, an insulating sheet is disposed between a wire-wound coil and a core or between wire-wound coils where currents with different phases flow to ensure the insulating property. As such insulating sheet, for example, a laminated film obtained by attaching sheets of wholly aromatic polyamide paper to each other via an aromatic polyamide resin-based resin composition has been used (for example, Japanese Patent Application Laid-open No. 2006-321183). In such insulating sheet, the heat resistance is improved by using the aromatic polyamide resin composition between the sheets of wholly aromatic polyamide paper. Such insulating sheet has a laminate structure and hence has a large thickness. Therefore, in order to increase the number of coils to improve its performance, the size inevitably becomes larger, and hence it has been required to decrease the thickness of the insulating sheet.

SUMMARY OF THE INVENTION

An object of the present invention is to provide a polyamide imide resin composition having excellent heat resistance, mechanical strength, and tracking resistance.

The inventors of the present invention have made intensive studies, and as a result, the inventors have found that the above-mentioned object can be achieved by a polyamide imide resin composition described below, thus completing the present invention.

A polyamide imide resin composition of the present invention includes a polymer blend of a polyamide imide resin including an alicyclic structure and an aromatic polyamide imide resin.

In a preferred embodiment, wherein the content of the polyamide imide resin including the alicyclic structure in the above-mentioned polymer blend is 50% by weight or less in terms of a resin solid content ratio.

In a preferred embodiment, the above-mentioned polymer blend has a glass transition temperature of 200° C. or more.

According to another aspect of the present invention, there is provided an insulating sheet. The insulating sheet includes the above-mentioned polyamide imide resin composition.

The polyamide imide resin composition of the present invention includes the polymer blend of the polyamide imide resin having an alicyclic structure and the aromatic polyamide imide resin. When such polyamide imide resin composition is used, both improved tracking resistance and excellent heat resistance can be achieved. Further, the polyamide imide resin composition of the present invention itself has insulating property, heat resistance, and tracking resistance, and hence can be suitably used as an insulating sheet of a monolayer.

DETAILED DESCRIPTION OF THE PREFERRED EMBODIMENTS

<A. Polyamide Imide Resin Composition>

The polyamide imide resin composition of the present invention includes a polymer blend of a polyamide imide resin having an alicyclic structure and an aromatic polyamide imide resin. Observation of the polymer blend of the polyamide imide resin having an alicyclic structure and the aromatic polyamide imide resin used in the present invention by atomic force microscope (AFM) shows that the blend has a sea-island structure in which the polyamide imide resin having an alicyclic structure (island portion) is dispersed in the aromatic polyamide imide resin (sea portion). In the case of using the polyamide imide resin having an alicyclic structure, the resultant film may have insufficient flexibility. The polymer blend used in the present invention has a sea-island structure in which the aromatic polyamide imide resin having excellent flexibility includes the alicyclic polyamide imide resin, and hence the polymer blend can not only provide effects of improving tracking resistance and keeping original heat resistance of the resin through use of the polyamide imide resin having an alicyclic structure but also allow formation of a film having excellent flexibility as well.

In the above-mentioned polymer blend, the ratio of the polyamide imide resin having an alicyclic structure is preferably 50% by weight or less, more preferably 40% by weight or less in terms of a resin solid content ratio. When the ratio of the polyamide imide resin having an alicyclic structure is 50% by weight or less, i.e., when the ratio of the aromatic polyamide imide resin is 50% by weight or more, the resultant film can have further improved flexibility.

The above-mentioned polymer blend has a glass transition temperature of preferably 200° C. or more, more preferably 210° C. or more. If the polymer blend used in the present invention has a glass transition temperature within the above-mentioned range, a film obtained by using the polyamide imide resin composition of the present invention can be suitably used in applications requiring heat resistance.

<A-1. Polyamide Imide Resin Having an Alicyclic Structure>

The polyamide imide resin having the alicyclic structure used in the present invention is a polyamide imide resin obtained by introducing the alicyclic structure into the structure of the polyamide imide resin. The alicyclic structure has a structure in which carbon atoms are bonded via single bonds, and hence can suppress production of free carbon in thermal decomposition. Further, the alicyclic structure is a bulky ring structure, and hence can keep the heat resistance without significantly lowering the glass transition temperature. The polyamide imide resin having the alicyclic structure can be obtained by, for example, using a compound having the alicyclic structure in the synthesis of a polyamide imide resin. Preferably, the polyamide imide resin having the alicyclic structure does not include an aromatic ring structure derived from a compound other than trimellitic anhydride used in production. Use of such polyamide imide resin can further improve tracking resistance. The ratio of the alicyclic structure in the polyamide imide resin having the alicyclic structure can be adjusted by appropriately setting the rate of the compound having an alicyclic structure used in synthesis.

As a method for the synthesis of the polyamide imide resin having the alicyclic structure, any appropriate method may be employed. Examples of the method include an acid chloride method involving reacting trimellitic anhydride chloride with a diamine, an isocyanate method involving reacting trimellitic anhydride with a diisocyanate, and a direct polymerization method involving reacting trimellitic anhydride with a diamine. Of those, an isocyanate method is preferred in view of excellent work efficiency.

In the case where the polyamide imide resin having the alicyclic structure is synthesized by the above-mentioned isocyanate method, examples of the compound having the alicyclic structure include an alicyclic diisocyanate and a cyclohexane tricarboxylic anhydride. Of those, an alicyclic diisocyanate is preferably used because it is excellent in terms of cost.

Any appropriate alicyclic diisocyanate may be used as the alicyclic diisocyanate, and examples thereof include isophorone diisocyanate, hydrogenated xylylene diisocyanate, norbornene diisocyanate, and dicyclohexylmethane diisocyanate. Of those, dicyclohexylmethane diisocyanate is preferred because it has less environmental load and is excellent in terms of cost.

Any appropriate solvent may be used as the solvent, and examples thereof include N-methyl-2-pyrrolidinone, N,N-dimethylacetamide, and γ-butyrolactone. They may be used alone or in combination.

A catalyst may be used for the synthesis of the above-mentioned polyamide imide resin having an alicyclic structure, as necessary. Any appropriate catalyst may be used as the catalyst, and examples thereof include diazabicycloundecene, triethylenediamine, potassium fluoride, and cesium fluoride.

The reaction temperature and reaction time have only to be appropriately set. For example, the reaction temperature may be set to 150° C. to 250° C., and the reaction time may be set to 5 hours to 20 hours.

As a method for the synthesis of the aromatic polyamide imide resin, the same method as the method for the synthesis of the polyamide imide resin having an alicyclic structure may be employed, and the isocyanate method is preferred in view of excellent work efficiency.

In the case where the aromatic polyamide imide resin is synthesized by the above-mentioned isocyanate method, an aromatic diisocyanate or the like is given as a compound having an aromatic structure include. In view of excellent work efficiency, the isocyanate method is preferably performed using the aromatic diisocyanate.

Any appropriate aromatic diisocyanate may be used as the aromatic diisocyanate, and examples thereof include diphenylmethane diisocyanate, tolylene diisocyanate, tetramethylxylene diisocyanate, and 3,3'-dimethylbiphenyl-4,4'-diisocyanate. Of those, diphenylmethane diisocyanate is preferred because it is excellent in terms of cost.

As a solvent, a solvent used in the synthesis of the above-mentioned polyamide imide resin having an alicyclic structure is suitably used.

The reaction temperature and reaction time have only to be appropriately set. For example, the reaction temperature may be set to 80° C. to 250° C., and the reaction time may be set to 1 hour to 10 hours. Further, if necessary, a catalyst may be used, and any of the same catalysts as described above may be used as the catalyst.

As a method for preparation of the above-mentioned polymer blend, any appropriate method may be used. Examples of the method include a method involving mixing a varnish obtained by synthesizing the polyamide imide resin having an alicyclic structure and a varnish obtained by synthesizing the aromatic polyamide imide resin at a predetermined ratio.

The polyamide imide resin composition used in the present invention may contain another additive as far as the effect of the present invention is not impaired. As the additive, an additive generally used as a filler for an insulating material may be used. Specific examples thereof include silica, alumina, titania, boron nitride, magnesium hydroxide, aluminum hydroxide, and clay.

<B. Insulating Sheet>

An insulating sheet according to one embodiment of the present invention includes the above-mentioned polyamide imide resin composition. The above-mentioned polyamide imide resin composition itself is excellent in heat resistance, mechanical strength, and tracking resistance. Therefore, a film formed from the above-mentioned polyamide imide resin composition may be used singly as an insulating sheet.

The insulating sheet of the present invention may be subjected to a surface treatment in order to improve its sliding property.

The thickness of the above-mentioned insulating sheet is preferably 10 μm to 150 μm. The insulating sheet of the present invention can be formed thinner than a conventional insulating sheet formed of a laminated film (usually, having a thickness of 200 μm to 250 μm) and has excellent insulating property. Therefore, when the insulating sheet of the present invention is used, the size of a product including the insulating sheet, such as a rotating electrical machine or a transformer, can be reduced. In addition, the insulating sheet itself is thin, and hence the number of coils can be increased without increasing the size to improve the performance of a motor or the like.

EXAMPLES

The present invention is described in more detail by way of the following examples and comparative examples. It should be noted that the present invention is not limited only to the examples. It should be noted that analysis methods used in the examples are as follows.

(1) Carbon Residue Rate:

TG-DTA 2000 SA (manufactured by Bruker AXS K.K.) was used to increase the temperature to 500° C. at a temperature increase rate of 10° C./min, and the carbon residue rate at 500° C. was calculated from the decreased weight.

(2) Thickness:

Measurement was performed using a micro-gauge thickness meter (manufactured by Mitutoyo Corporation).

(3) Tracking Resistance (CTI Value):

The CTI value was measured in accordance with IEC-60112 using a tracking resistance testing apparatus (manufactured by Yamazaki Sangyo, product name "Tracking resistance testing machine, model HAT-500-3"). 50 drops of an aqueous solution of 0.1% ammonium chloride were dropped, and the maximum voltage at which a test piece was able to endure without causing tracking was measured. When the resultant value is larger, the sample has more excellent tracking resistance.

(4) Breakdown Voltage:

A breakdown voltage was measured using a dielectric strength testing apparatus (manufactured by Tokyo Transformer Co., Ltd.) with 12.5-mm spherical electrodes at an interelectrode load of 500 g and a voltage increase rate of 1,000 V/sec. When the resultant value is larger, the sample has more excellent insulating property.

(5) Flexibility:

When a film was peeled off from a glass substrate in each of Examples and Comparative Examples, if the film caused no crack, the film was represented by the symbol "○", while if the film caused a crack, the film was represented by the symbol "x".

(6) Glass Transition Temperature:

Measurement was performed using DSC 200 F3 (manufactured by Bruker AXS K.K.) at a temperature increase rate of 10° C./min, and the point of reverse curve was determined as a glass transition temperature.

(7) Tensile Modulus of Elasticity, Tensile Strength, Breaking Elongation:

A film was die-cut into a No. 3 dumbbell shape and used as a sample. Evaluation was performed using a universal testing instrument, TENSILON (manufactured by Toyo Baldwin Co., Ltd.) at a tension rate of 100 mm/min.

Synthesis Example 1

0.3 mol of trimellitic anhydride (TMA), 0.3 mol of diphenylmethane diisocyanate (MDI), and 198 mL of N-methyl-2-pyrrolidinone (NMP) were fed to a four-necked flask equipped with a mechanical stirrer with a stirring blade, and the mixture was allowed to react at 120° C. for 3 hours. Table 1 shows the composition ratio of the resultant varnish.

Synthesis Example 2

0.3 mol of TMA, 0.3 mol of dicyclohexylmethane diisocyanate (HMDI), 204 mL of NMP, and 0.003 mol of diazabicycloundecene (DBU) as a catalyst were fed to a four-necked flask equipped with a mechanical stirrer with a stirring blade, and the mixture was allowed to react at 200° C. for 9 hours. Table 1 shows the composition ratio of the resultant varnish.

Synthesis Example 3

0.3 mol of TMA, 0.15 mol of MDI, 0.15 mol of HMDI, and 201 mL of NMP were fed to a four-necked flask equipped with a mechanical stirrer with a stirring blade, and the mixture was allowed to react at 120° C. for 2 hours. Subsequently, 0.0015 mol of diazabicycloundecene (DBU) was fed as a catalyst, and the whole was allowed to react at 200° C. for 5 hours. Table 1 shows the composition ratio of the resultant varnish.

TABLE 1

| | Composition ratio (mol %) | | |
| --- | --- | --- | --- |
| | TMA | MDI | HMDI |
| Synthesis Example 1 | 50 | 50 | — |
| Synthesis Example 2 | 50 | — | 50 |
| Synthesis Example 3 | 50 | 25 | 25 |

Example 1

The varnishes obtained in Synthesis Examples 1 and 2 were mixed at Synthesis Example 1/Synthesis Example 2=7/3 in terms of a weight ratio of the resin solid contents and applied onto a glass substrate. Subsequently, the coated glass substrate was heated at 80° C. for 15 minutes, at 150° C. for 15 minutes, and at 240° C. for 15 minutes in a high-temperature incubator. The substrate was cooled to room temperature, and the varnish was peeled off from the glass substrate, to thereby obtain a film. Tables 2 and 3 show properties of the resultant film.

Example 2

A film was obtained in the same manner as in Example 1 except that the ratio of Synthesis Example 1 to Synthesis Example 2 was changed to Synthesis Example 1/Synthesis Example 2=5/5 in terms of a weight ratio of the resin solid contents. Tables 2 and 3 show properties of the resultant film.

Comparative Example 1

A film was obtained in the same manner as in Example 1 except that only the varnish of Synthesis Example 1 was used. Tables 2 and 3 show properties of the resultant film.

Comparative Example 2

Only the varnish obtained in Synthesis Example 2 was applied onto a glass substrate in the same manner as in Example 1 and cooled to room temperature. After drying, the coating film was cracked when peeled off from the glass substrate, and a film was not obtained. Table 2 shows the carbon residue rate of the polyamide imide resin composition used, and Table 3 shows the glass transition temperature of the composition.

Comparative Example 3

Only the varnish obtained in Synthesis Example 3 was applied onto a glass substrate in the same manner as in Example 1 and cooled to room temperature. After drying, the coating film was cracked when peeled off from the glass substrate, and a film was not obtained. Table 2 shows the carbon residue rate of the polyamide imide resin composition used, and Table 3 shows the glass transition temperature of the composition.

TABLE 2

| | Composition (wt %) | | | Carbon residue rate (wt %) | Thickness (μm) | CTI value (V) | Breakdown voltage (kV) |
| | Synthesis Example 1 | Synthesis Example 2 | Synthesis Example 3 | | | | |
|---|---|---|---|---|---|---|---|
| Example 1 | 70 | 30 | — | 45 | 115 | 500 | 15.4 |
| Example 2 | 50 | 50 | — | 35 | 111 | 600 | 14.5 |
| Comparative Example 1 | 100 | — | — | 79 | 115 | 225 | 13.5 |
| Comparative Example 2 | — | 100 | — | 12 | — | — | — |
| Comparative Example 3 | — | — | 100 | 36 | — | — | — |

TABLE 3

| | Flexibility | Glass transition temperature (°C.) | Tensile modulus of elasticity (GPa) | Tensile strength (MPa) | Breaking elongation (%) |
|---|---|---|---|---|---|
| Example 1 | ○ | 231 | 2.3 | 112 | 48 |
| Example 2 | ○ | 228 | 2.2 | 109 | 47 |
| Comparative Example 1 | ○ | 241 | 2.3 | 135 | 53 |
| Comparative Example 2 | x | 203 | — | — | — |
| Comparative Example 3 | x | 254 | — | — | — |

[Evaluation]

As is clear from Tables 2 and 3, the polyamide imide resin composition including the polymer blend of the polyamide imide resin having an alicyclic structure and the aromatic polyamide imide resin of each of Examples 1 and 2 was excellent in tracking resistance and insulating property. In addition, the polyamide imide resin composition of each of Examples 1 and 2 was excellent in flexibility and physical strength. On the other hand, the polyamide imide resin composition including only the aromatic polyamide imide resin of Comparative Example 1 was excellent in heat resistance and mechanical strength but inferior in tracking resistance. Meanwhile, the polyamide imide resin composition including only the polyamide imide resin having an alicyclic structure of Comparative Example 2 had a low carbon residue rate and hence was considered to have excellent tracking resistance. However, the composition was difficult to form into a film because of its inferior flexibility, and hence it was impossible to measure the tracking resistance. In Comparative Example 3, in which the copolymer of the polyamide imide resin having an alicyclic structure and the aromatic polyamide imide resin was used, the ratio of the polyamide imide resin having an alicyclic structure to the aromatic polyamide imide resin in the polyamide imide resin composition was the same as that in Example 2. However, as is the case with Comparative Example 2, the composition of Comparative Example 3 was estimated to have excellent tracking resistance from the carbon residue rate but had inferior flexibility, and hence it was difficult to form a film and to measure the tracking resistance.

The polyamide imide resin composition of the present invention may be used for any appropriate application. The polyamide imide resin composition of the present invention can achieve flexibility and physical strength along with tracking resistance, and hence can be suitably used for an industrial motor, an automotive motor, a transformer, a wire coating material for electronics, or the like.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polyamide imide resin composition, comprising a polymer blend of a polyamide imide resin including an alicyclic structure and an aromatic polyamide imide resin, wherein the blend has a sea-island structure in which the polyamide imide resin having an alicyclic structure is dispersed in the aromatic polyamide imide resin.

2. A polyamide imide resin composition according to claim 1, wherein the content of the polyamide imide resin including an alicyclic structure in the polymer blend is 50% by weight or less in terms of the resin solid content ratio.

3. A polyamide imide resin composition according to claim 1, wherein the polymer blend has a glass transition temperature of 200° C. or more.

4. An insulating sheet, comprising the polyamide imide resin composition according to claim 1.

5. An insulating sheet comprising a film made of the polyimide resin composition according to claim 1, wherein the thickness of the insulating sheet is 10 μm to 150 μm.

* * * * *